UNITED STATES PATENT OFFICE.

JOSEPH KOETSCHET, OF LYON, AND ANDRÉ BARBIER, OF ST. FONS, NEAR LYON, FRANCE, ASSIGNORS TO SOCIÉTÉ CHIMIQUE DES USINES DU RHÔNE, ANCIENNEMENT GILLIARD, P. MONNET ET CARTIER, OF PARIS, FRANCE, A CORPORATION OF FRANCE.

MANUFACTURE OF ORTHONITROBENZALDEHYDE.

997,301. Specification of Letters Patent. Patented July 11, 1911.

No Drawing. Application filed October 7, 1910. Serial No. 585,774.

*To all whom it may concern:*

Be it known that we, JOSEPH KOETSCHET, of Lyon, France, and ANDRÉ BARBIER, of St. Fons, near Lyon, France, have invented certain new and useful Improvements in the Manufacture of Orthonitrobenzaldehyde, of which the following is a specification.

We have found that ortho-nitrophenyl-nitro-methane can be readily and smoothly converted, in the form of solutions of its salts, into ortho-nitrobenzaldehyde. If permanganate salts, preferably in calculated proportion, are caused to act on aqueous solutions of the salts of nitro-phenyl-nitro-methane, the formation of nitro-benzaldehyde takes place smoothly. If care is taken that the reaction liquid remains always neutral or only very weakly alkaline, it is possible to obtain almost theoretical yields. This is the more remarkable, as oxidation with permanganate usually yields only acids and no aldehydes.

Example: A dilute solution of 204 grams of the sodium salt of ortho-nitrophenyl nitromethane in 2000 cc. water is mixed at a low temperature with a cold solution of 105 grams permanganate of potassium (theoretical proportion) in 3000 cc. of water, and thoroughly stirred The formation of ortho-nitrobenzaldehyde occurs almost immediately, in accordance with the formula:

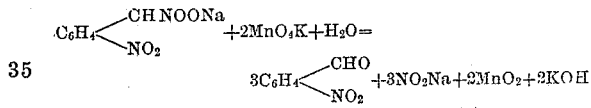

Sodium nitrite and caustic potash remain in solution, while nitrobenzaldehyde and binoxid of manganese are precipitated. The aldehyde is separated by the known means from the solution and from the manganese binoxid. It is obtained in a high degree of purity.

Still better yields can be obtained by adding to the permanganate solution such a quantity of magnesium sulfate that the detrimentally acting alkali liberated is replaced by magnesia, which has no injurious action. Instead of magnesium sulfate, other salts giving a similar result may be employed.

What we claim and desire to secure by Letters Patent is:—

1. A process for the manufacture of ortho-nitrobenzaldehyde, comprising treatment of a neutral or approximately neutral solution of a salt of ortho-nitrophenyl-nitromethane with a permanganate.

2. A process for the manufacture of ortho-nitrobenzaldehyde, comprising treatment of a neutral or approximately neutral solution of a salt of ortho-nitrophenyl-nitromethane with a permanganate, in presence of a substance capable of reacting with liberated alkali to prevent detrimental action thereof.

3. A process for the manufacture of ortho-nitrobenzaldehyde comprising treatment of a neutral or approximately neutral solution of a salt of ortho-nitrophenyl-nitromethane with a permanganate, in presence of magnesium sulfate, substantially as described.

4. A process for the manufacture of ortho-nitrobenzaldehyde, comprising treatment of a neutral or approximately neutral solution of sodium salt of ortho-nitro-phenylnitro methane with a permanganate, in presence of magnesium sulfate, substantially as described.

In witness whereof, we have hereunto signed our names in the presence of two subscribing witnesses.

JOSEPH KOETSCHET.
ANDRÉ BARBIER.

Witnesses:
W. E. WATTS,
GUILLOT CLAUDE.